(12) United States Patent
Chen

(10) Patent No.: US 8,481,189 B2
(45) Date of Patent: Jul. 9, 2013

(54) BATTERY RECEPTACLE

(75) Inventor: Song-Ya Chen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 347 days.

(21) Appl. No.: 12/894,187

(22) Filed: Sep. 30, 2010

(65) Prior Publication Data

US 2012/0009453 A1    Jan. 12, 2012

(30) Foreign Application Priority Data

Jul. 7, 2010    (CN) .......................... 2010 1 0219872

(51) Int. Cl.
*H01M 2/10*    (2006.01)
*H01M 2/26*    (2006.01)

(52) U.S. Cl.
USPC ............................. 429/100; 429/96; 429/121

(58) Field of Classification Search
None
See application file for complete search history.

(56) References Cited

U.S. PATENT DOCUMENTS

| | | | | |
|---|---|---|---|---|
| 5,316,491 A * | 5/1994 | Satou et al. | ................... | 439/159 |
| 5,457,745 A * | 10/1995 | Wang | ............................. | 379/454 |
| 5,508,123 A * | 4/1996 | Fan | .................................. | 429/96 |
| 2005/0231159 A1* | 10/2005 | Jones et al. | ..................... | 320/114 |
| 2006/0084481 A1* | 4/2006 | Tseng et al. | ................ | 455/575.1 |
| 2007/0145149 A1* | 6/2007 | Carnevali | ........................ | 235/486 |
| 2007/0207380 A1* | 9/2007 | Tononishi | ..................... | 429/176 |
| 2007/0247105 A1* | 10/2007 | Krieger et al. | ................. | 320/104 |

* cited by examiner

*Primary Examiner* — Ula C Ruddock
*Assistant Examiner* — Matthew Van Oudenaren
(74) *Attorney, Agent, or Firm* — Altis Law Group, Inc.

(57) ABSTRACT

A battery receptacle capable of receiving an external battery for an electronic device includes a receiving portion, a joint portion, a power input interface, and a power output interface. The receiving portion receives the external battery and includes a first receiving room and a second receiving room. The joint portion joins the battery receptacle to the electronic device. The power input interface electronically connects with an electrode of the external battery. The power output interface electronically connects with an external power connector of the electronic device.

8 Claims, 11 Drawing Sheets

BATTERY RECEPTACLE

BACKGROUND

1. Technical Field

The present disclosure relates to a battery receptacle capable of receiving an external battery for an electronic device.

2. Description of Related Art

Electronic devices such as mobile phones are often equipped with rechargeable batteries. The rechargeable batteries should be recharged when the power thereof is low or exhausted. However, it is inconvenient to recharge the rechargeable batteries in an outdoor environment.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
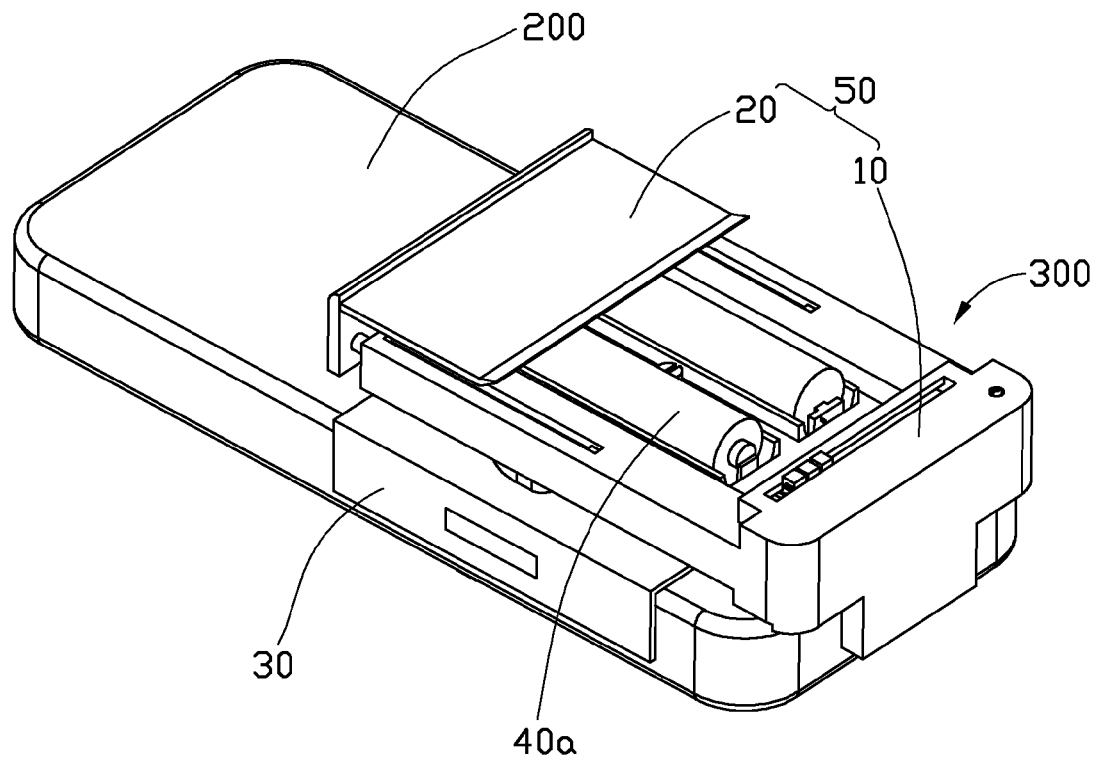
FIG. 1 is a perspective view of one embodiment of a battery receptacle used with an electronic device.

FIG. 1 is a perspective view of one embodiment of a battery receptacle 300 used with an electronic device 200. The electronic device 200 may be a laptop computer, a mobile phone, or a personal digital assistant (PDA), for example. In the exemplary embodiment, the electronic device 200 is a mobile phone. The battery receptacle 300 includes a housing portion 50 and a joint portion 30. The housing portion 50 includes a main body 10 and a battery cover 20 slidably mounted on the main body 10.

Figure 2:
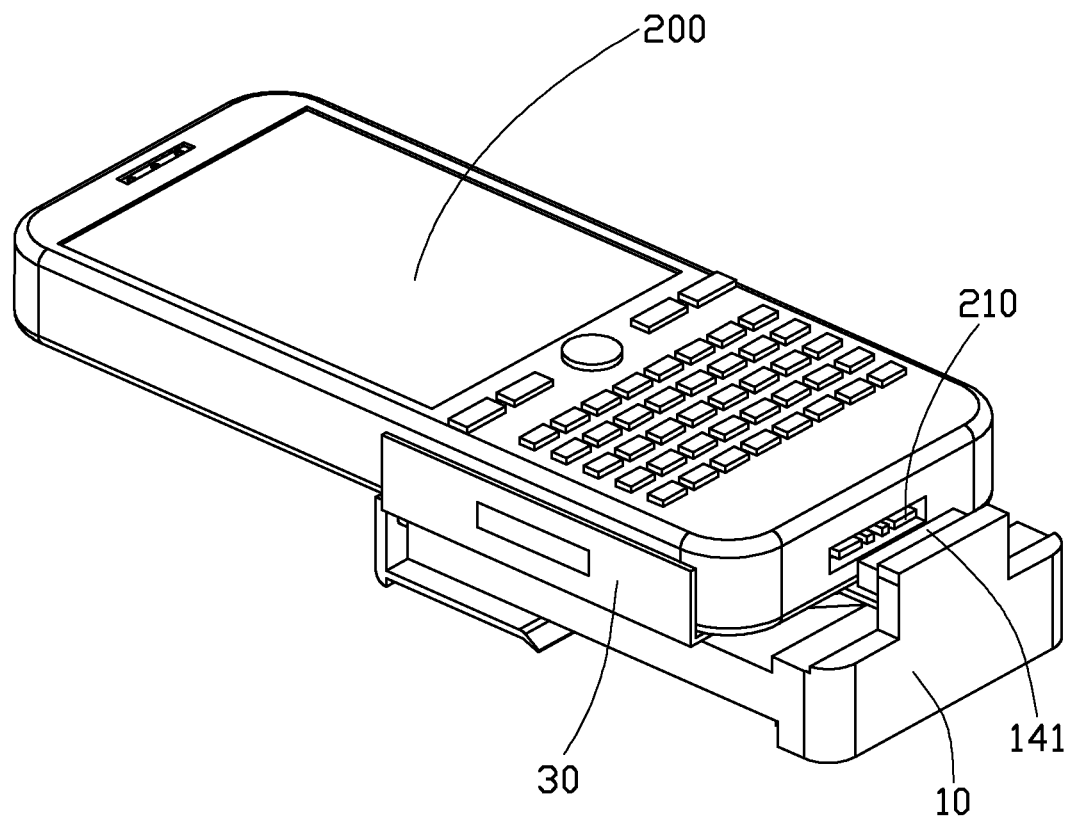
FIG. 2 is an inverted view of FIG. 1.

FIG. 2 is an inverted view of FIG. 1. The electronic device 200 includes an external power connector 210. The main body 10 of the battery receptacle 300 includes a power output interface 141 electronically connecting with the external power connector 210. In the embodiment, the external power connector 210 is located at the bottom of the electronic device 200.

Figure 3:
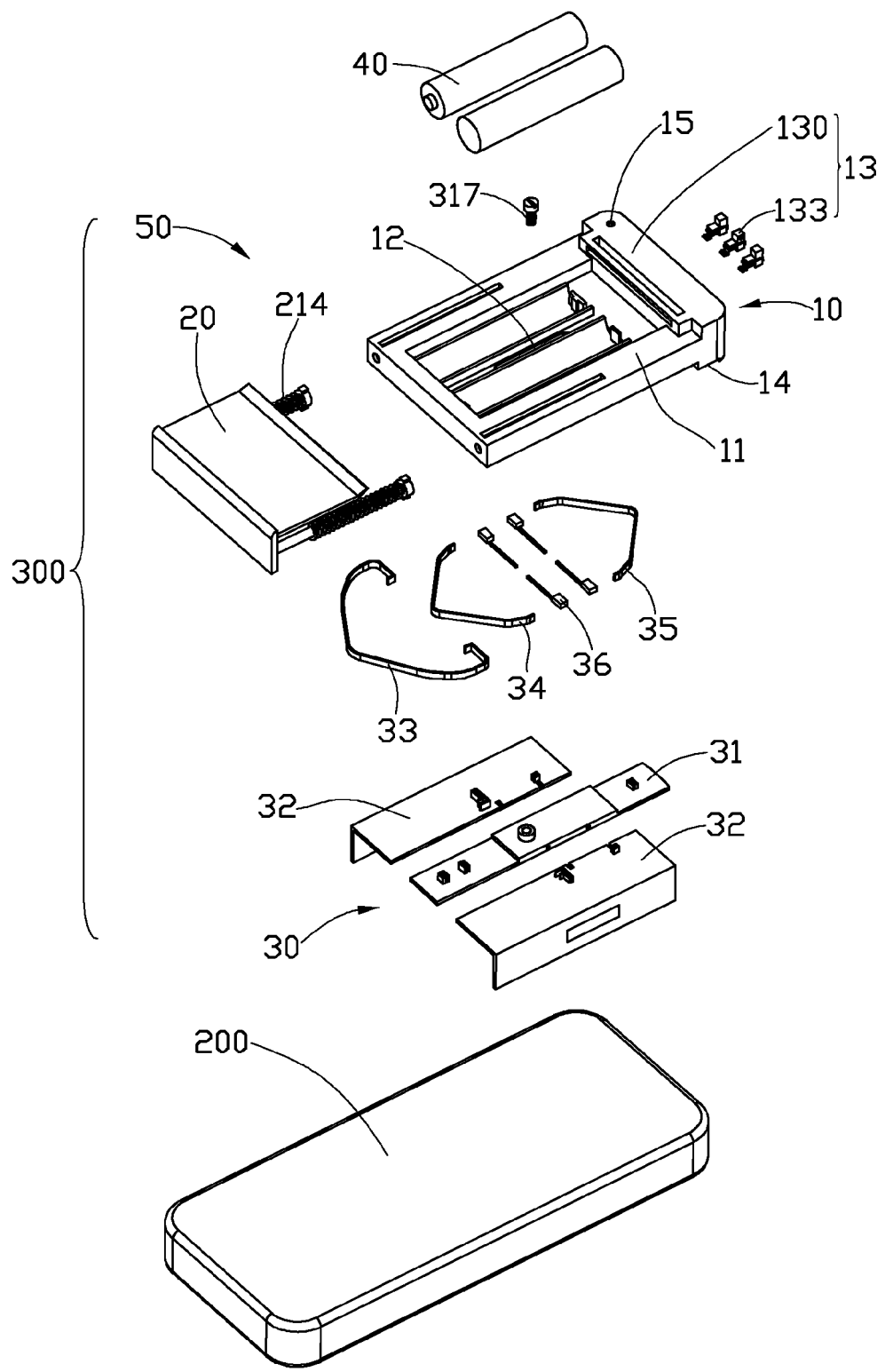
FIG. 3 is an exploded perspective view of the battery receptacle of FIG. 1.

FIG. 3 is an exploded perspective view of the battery receptacle 300 of FIG. 1. The main body 10 includes a receiving portion 11, a sliding groove 12, a first raised portion 13, a second raised portion 14, and an indicator 15. The first raised portion 13 is away from the joint portion 30 and the second raised portion 14 is near the joint portion 30. The sliding groove 12 is rectangular and defined on the middle of the receiving portion 11.

Figure 4:
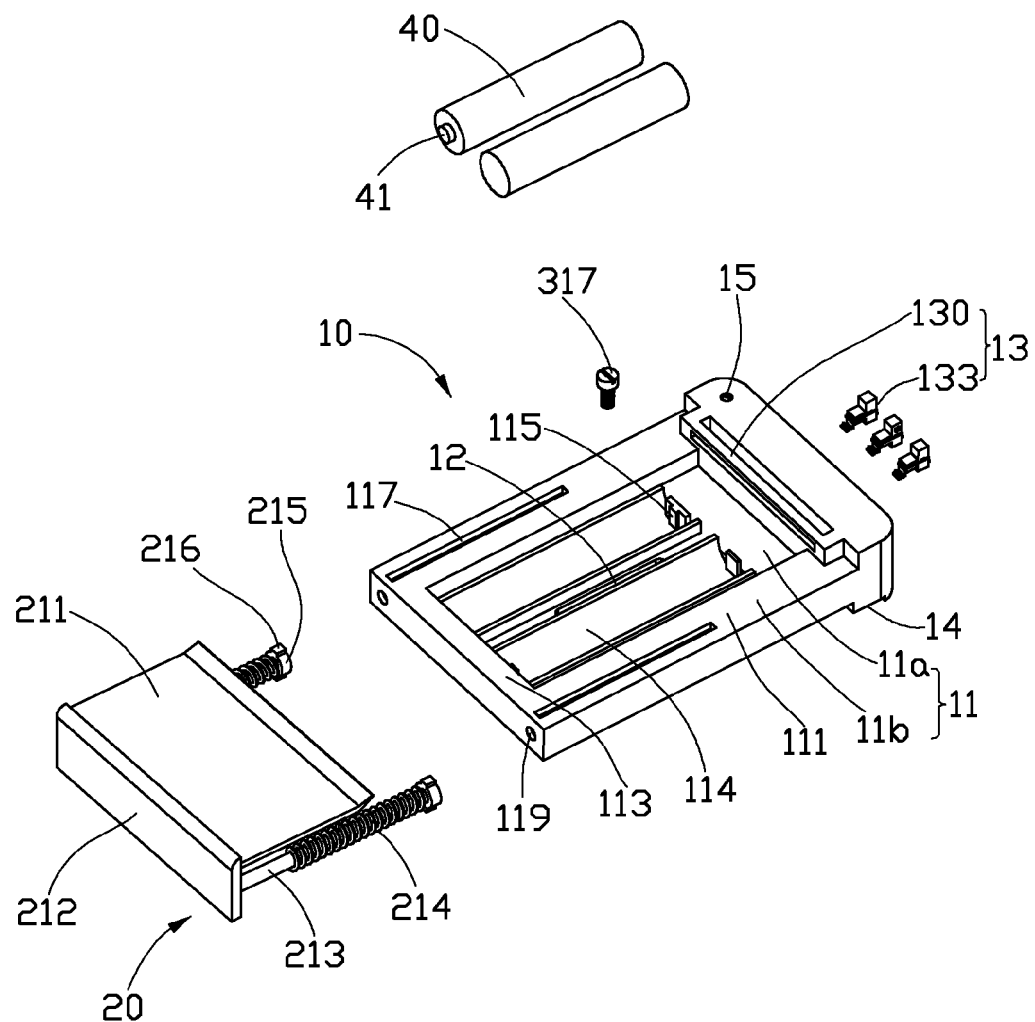
FIG. 4 is an enlarged partial view of the battery receptacle of FIG. 3.

FIG. 4 is an enlarged partial view of the battery receptacle 300 of FIG. 3. The receiving portion 11 receives an external battery 40 and includes a first receiving room 11a and a second receiving room 11b. In the exemplary embodiment, the external battery 40 is a cylindrical battery 40a shown in FIG. 1. The first receiving room 11a receives the cylindrical battery 40a and includes a pair of cavities 114. A power input interface (not shown) is further installed in the pair of cavities 114 of the first receiving room 11a. The power input interface of the first receiving room 11a includes an electrode 115 electronically connected with a positive terminal 41 of the external battery 40.

The receiving portion 11 includes two first edges 111 and a second edge 113 surrounding the pair of cavities 114. The pair of cavities 114 is between the two first edges 111. Two guide grooves 117 are individually defined on the two first edges 111. The second edge 113 is opposite to the first raised portion 13. A receiving groove 130 is defined on the first raised portion 13. Three slidable electrodes 133 are received in the receiving groove 130 and configured to be a power input interface of the second receiving room 11b.

The battery cover 20 includes an upper cover 211, a stopper board 212 perpendicularly connecting with the upper cover 211, two guide posts 213 perpendicularly connecting with the stopper board 212, and two elastic elements 214 individually coil around the two guide posts 213. In the embodiment, the elastic element 214 may be a spring. The two guide posts 213 are substantially parallel to the upper cover 211. Two positioning pins 215 are installed on two ends of the two guide posts 213 away from the stopper board 212. Two protrusions 216 are individually installed on the two positioning pins 215 and prevent the two elastic elements 214 from coming off the two guide posts 213.

Figure 5:
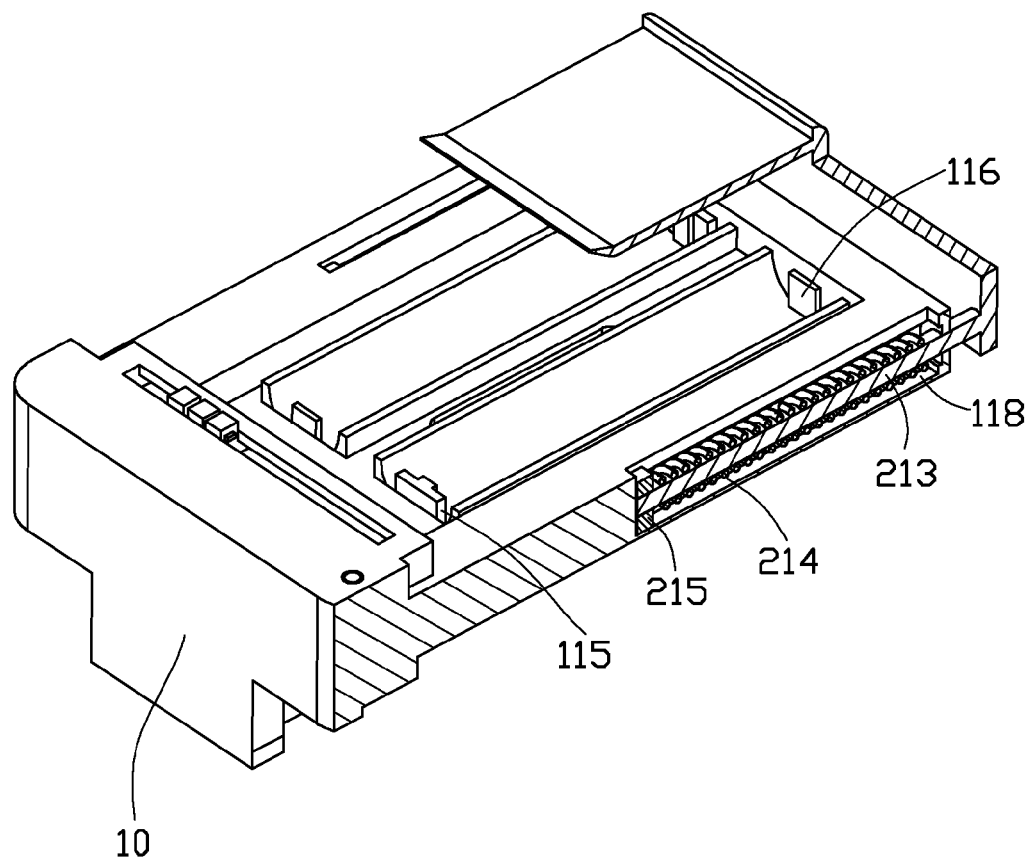
FIG. 5 is a partially cross-sectional view of the battery receptacle of FIG. 4.

FIG. 5 is a partially cross-sectional view of the battery receptacle 300 of FIG. 4. The power input interface of the first receiving room 11a further includes an electrode 116 electronically connected with a negative terminal (not labeled) of the external battery 40. The receiving portion 11 further includes two channels 118 individually defined in the two first edges 111. The two channels 118 communicate with the two guide grooves 117 and individually include two openings 119 defined through the second edge 113. The diameter of the opening 119 is less than that of the channel 118. The two channels 118 receive the two guide posts 213, the two elastic elements 214, and the two positioning pins 215. The diameter of the opening 119 is approximately equal to that of the guide post 213. The external diameter of the elastic element 214 is greater than the diameter of the opening 119 and less than the diameter of the positioning pin 215, such that the elastic element 214 is restricted between the opening 119 and positioning pin 215. As a result, the elastic element 214 may not come off the channel 118.

When the battery cover 20 is pulled away from the first raised portion 13 by an external force, the two guide posts 213 force the two positioning pins 215 to move away from the first raised portion 13 along the two guide grooves 117. The two positioning pins 215 compress the two elastic elements 214. When the external force is stopped, the two elastic elements 214 will extend to drive the two positioning pins 215 and the two guide posts 213 to move towards the first raised portion 13 along the two guide grooves 117. As a result, the battery cover 20 moves near the first raised portion 13.

Figure 6:
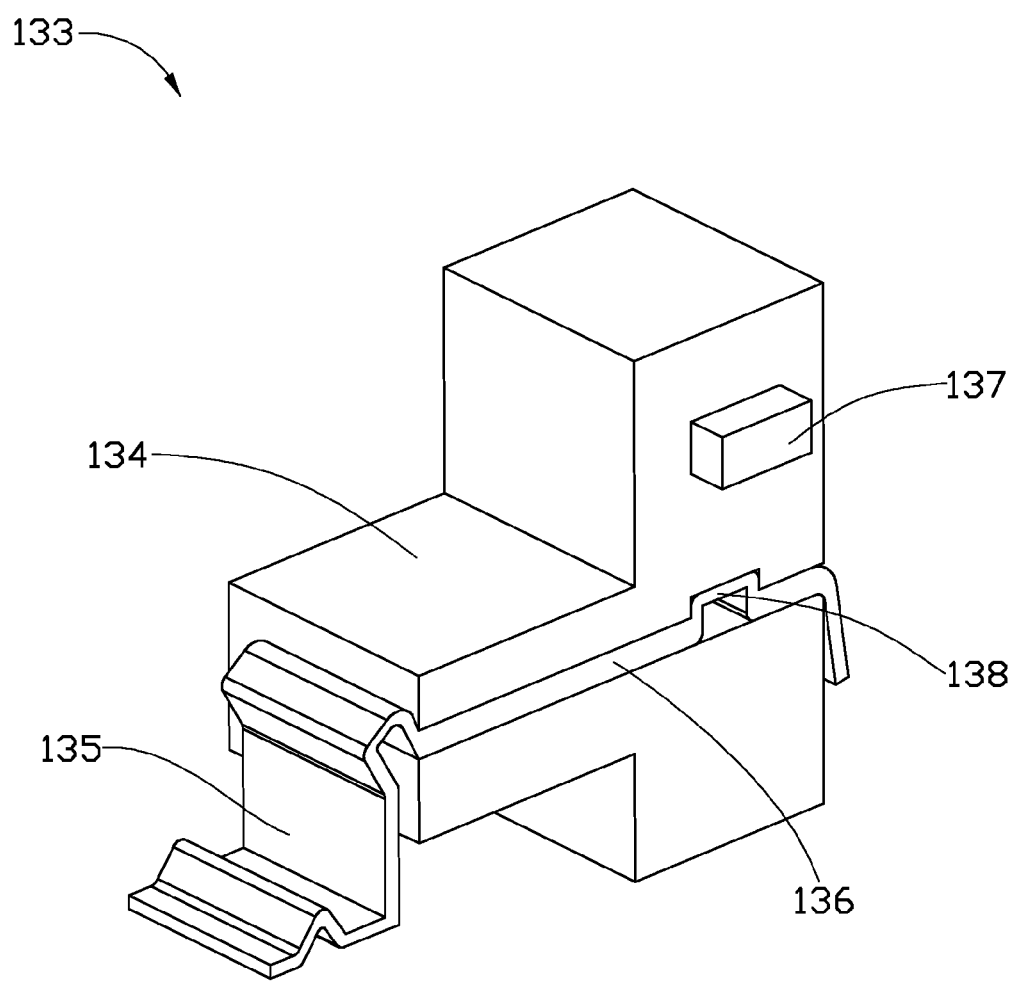
FIG. 6 is an enlarged view of an electrode shown in FIG. 3.

FIG. 6 is an enlarged view of the slidable electrode 133 shown in FIG. 3. The slidable electrode 133 includes a sliding element 134 and an elastic element 135. The sliding element 134 is approximately T-shaped and defines a groove 136 on the center line of the T-shape. The groove 136 further defines a recess 138. The elastic element 135 is inserted in the groove 136 and bends at the recess 138. Two ends of the elastic element 135 extend from the groove 136 and bend to abut the sliding element 134. Two opposite sides of the sliding element 134 further individually define two separating portions 137 away from the receiving portion 11. The three slidable electrodes 133 are spaced from each other with the separating portions 137.

Figure 7:
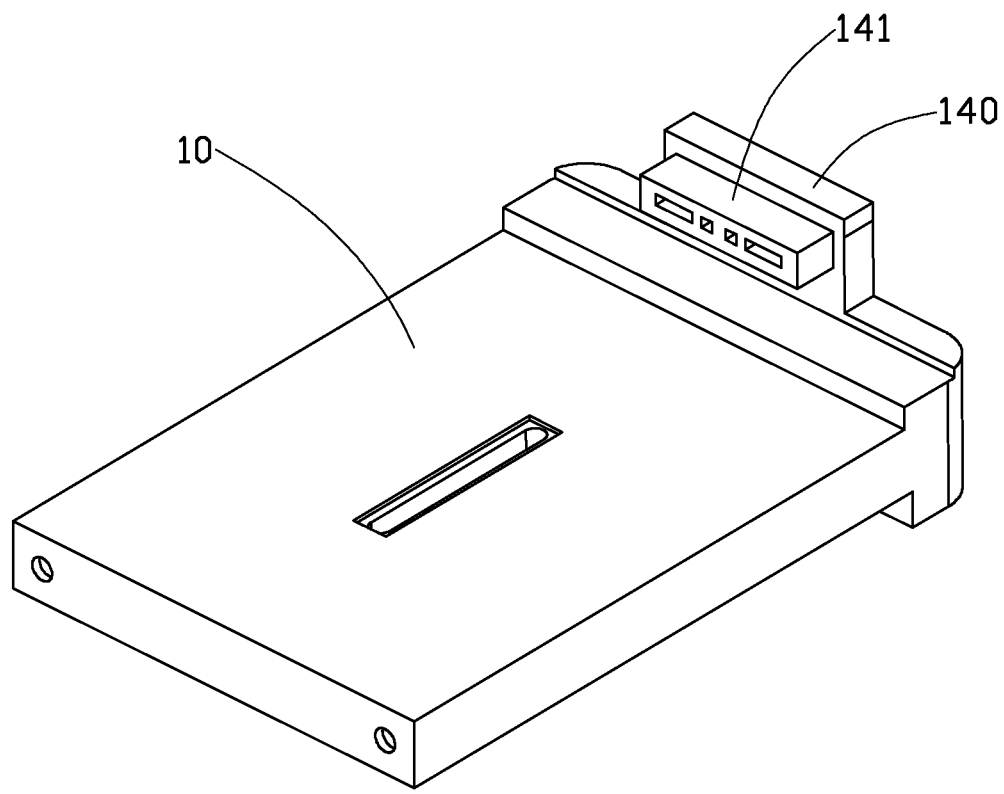
FIG. 7 is a perspective view of a main body shown in FIG. 3.

FIG. 7 is a perspective view of the main body 10 shown in FIG. 3, but inverted. The second raised portion 14 defines a mounting portion 140 and a power output interface 141. The power output interface 141 is configured to insert the external power connector 210 of the electronic device 200. The power output interface 141 is installed on the mounting portion 140 and is substantially parallel to the main body 10. The power output interface 141 electronically connects with the electrode 115, the electrode 116, and the elastic element 135. As a result, the external battery 40 may supply power to the electronic device 200 through the electrode 115, the electrode 116, the elastic element 135, the power output interface 141, and the external power connector 210. The indicator 15 is lit when the external battery 40 supplies power to the electronic device 200.

Figure 8:
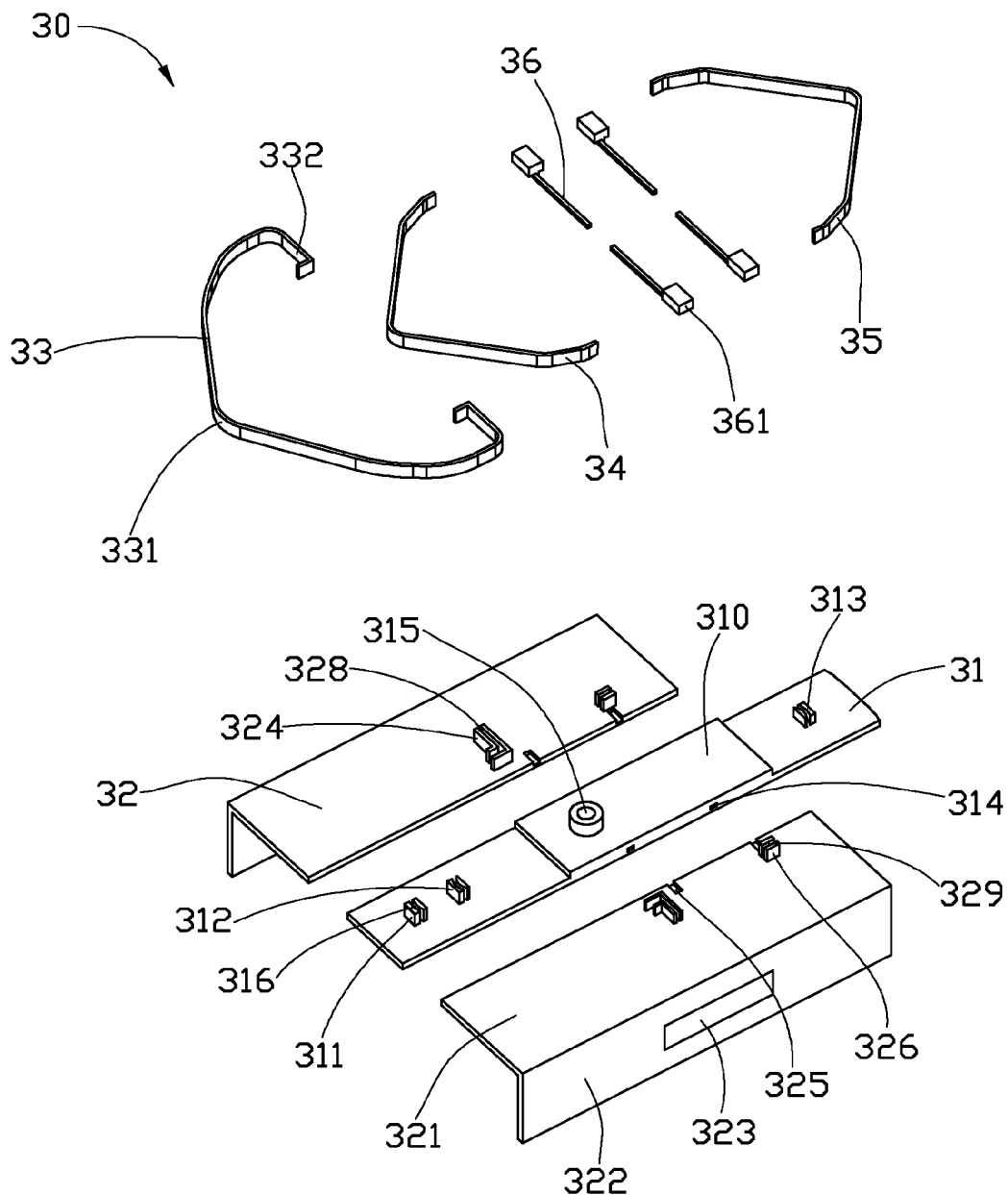
FIG. 8 is an enlarged view of a joint portion shown in FIG. 3.

FIG. 8 is an enlarged view of the joint portion 30 shown in FIG. 3. The joint portion 30 attaches the battery receptacle 300 to the electronic device 200. The joint portion 30 includes a positioning board 31, a pair of clamping boards 32, a first elastic element 33, a second elastic element 34, a third elastic element 35, and four guide rods 36. The pair of clamping boards 32 is installed on two opposite sides of the positioning board 31 and movable relative to the positioning board 31.

The positioning board 31 is approximately rectangular and includes a protruding board 310, a first positioning element 311, a second positioning element 312, a third positioning element 313, and two through holes 314. The protruding board 310 is also approximately rectangular and the through holes 314 pass through two long sides of the protruding board 310. The first positioning element 311 and the second positioning element 312 are located near one short side of the protruding board 310, and the third positioning element 313 is located near other short side of the protruding board 310. Three first slots 316 are individually defined in the first positioning element 311, the second positioning element 312, and the third positioning element 313. The three first slots 316 individually fix the first elastic element 33, the second elastic element 34, and the third elastic element 35.

Each of the pair of clamping boards 32 includes an upper board 321, a lower board 322, a fourth positioning element 324, two positioning slots 325, and a fifth positioning element 326. The lower board 322 perpendicularly connects with the upper board 321. An opening 323 is defined on the lower board 322. The power output interface 141 may pass through the opening 323 to insert in the external power connector 210 of the electronic device 200. The fourth positioning element 324, the two positioning slots 325, and the fifth positioning element 326 are defined on the upper board 321. A second slot 328 is defined in the fourth positioning element 324 and a third slot 329 is defined in the fifth positioning element 326. The second slot 328 and the third slot 329 are both approximately L-shaped.

A mounting element 361 is defined on one end of the guide rod 36 and mounts in the positioning slot 325. The other end of the guide rod 36 is inserted in the through hole 314, such that the pair of clamping boards 32 may be movable relative to the positioning board 31 along the guide rod 36. The first elastic element 33, the second elastic element 34, and the third elastic element 35 are approximately arc-shaped. The first elastic element 33 includes a middle part 331 and two bent parts 332.

Figure 9:
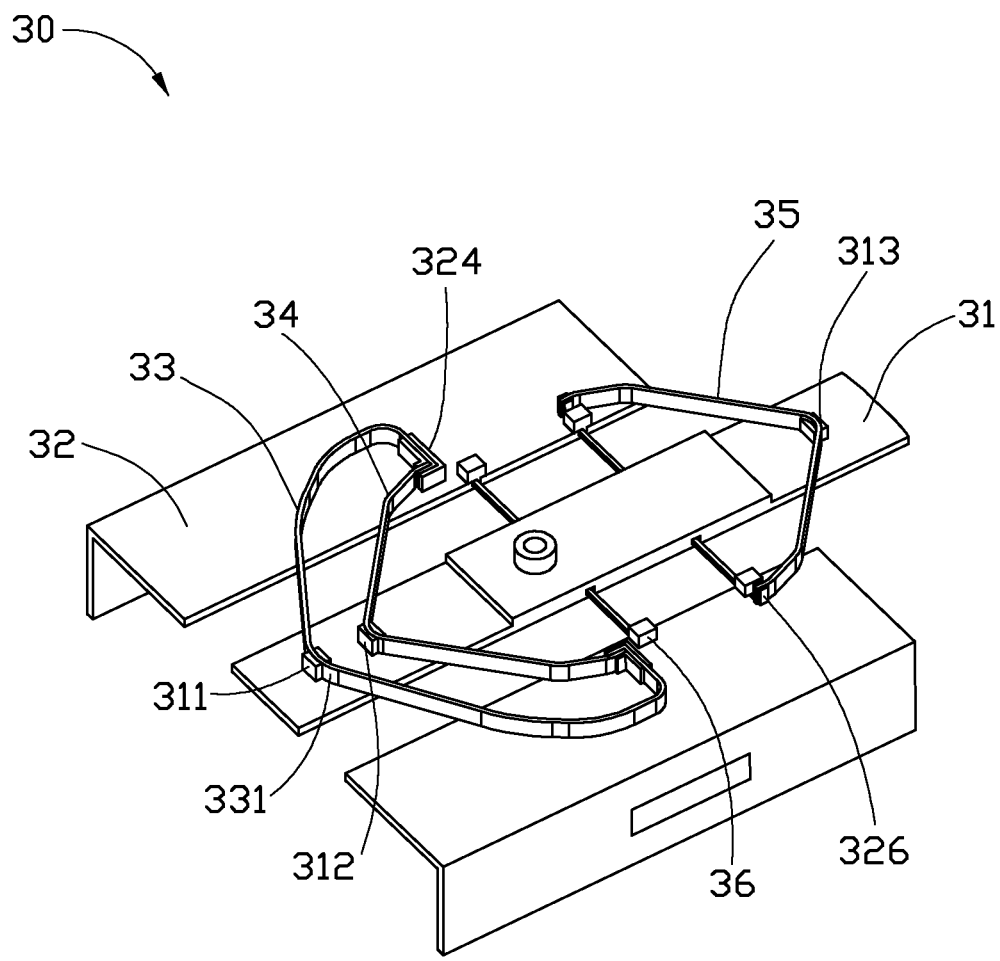
FIG. 9 is an assembled view of the joint portion shown in FIG. 8

FIG. 9 is an assembled view of the joint portion 30 shown in FIG. 8. The middle part 331 is mounted in the first slot 316 of the first positioning element 311. The two bent parts 332 are individually mounted in the two second slots 328 of the two fourth positioning elements 324. Similar to the first elastic element 33, the second elastic element 34 is mounted in the second positioning element 312 and the two fourth positioning elements 324. The third elastic element 35 is mounted in the third positioning element 313 and the two fifth positioning elements 326. Two gaps between the pair of clamping boards 32 and the positioning board 31 may be adjusted through the elasticity of the first elastic element 33, the second elastic element 34, and the third elastic element 35. As a result, the joint portion 30 may be adjustable to fit the electronic device 200.

The joint portion 30 further includes a slidable pivot 315 and a fastener 317 shown in FIG. 3. The fastener 317 passes through the sliding groove 12 of the housing portion 50 to be threadedly engaged with the slidable pivot 315, such that the joint portion 30 may be attached to the housing portion 50. The slidable pivot 315 may slide in the sliding groove 12, such that the housing portion 50 may slide along the sliding groove 12 and pivot on the slidable pivot 315 relative to the joint portion 30.

Figure 10:
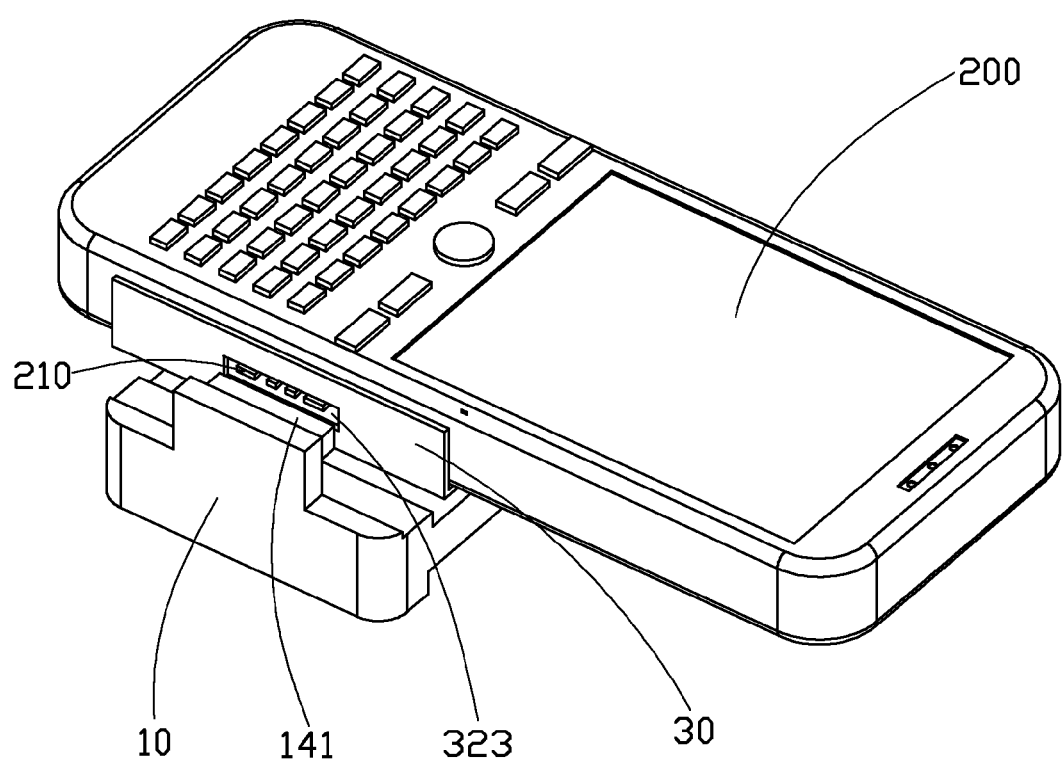
FIG. 10 is a perspective view of the battery receptacle used with an electronic device in another state.

FIG. 10 is a perspective view of the battery receptacle 300 used with the electronic device 200 in another state. In the embodiment, the external power connector 210 is located at the side of the electronic device 200. The housing portion 50 may pivot on the slidable pivot 315 relative to the joint portion 30, such that the power output interface 141 may pass through the opening 323 to insert in the external power connector 210 of the electronic device 200.

Figure 11:
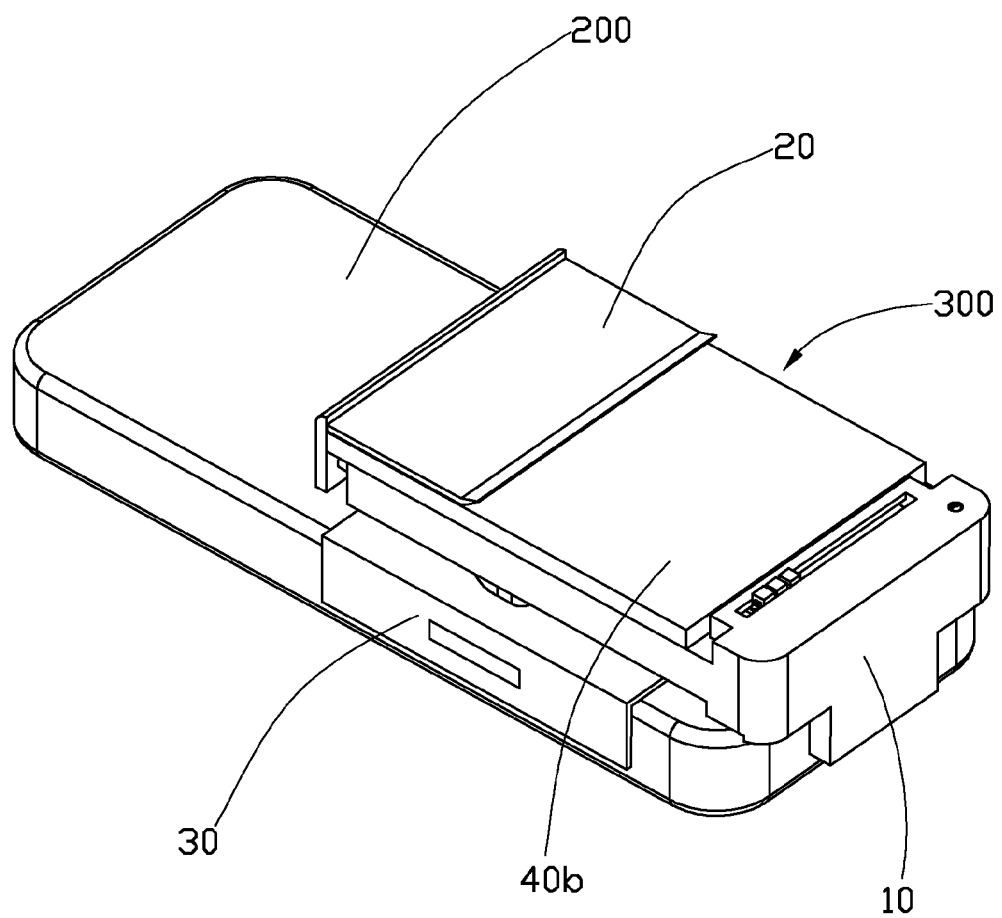
FIG. 11 is a perspective view of the battery receptacle of FIG. 1 in another state.

FIG. 11 is a perspective view of the battery receptacle 300 of FIG. 1 in another state. In the embodiment, the external battery 40 is a square battery 40b and received in the second receiving room 11b. The battery cover 20 may be moved by sliding the two guide posts 213 in the two channels 118 to fit the square battery 40b of different sizes. The three slidable electrodes 133 may be moved to electronically connect with electrodes (not shown) of the square battery 40b.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A battery receptacle capable of receiving an external battery for an electronic device, comprising:
   a main body comprising a receiving portion and a raised portion adjacent to the receiving portion;
   the receiving portion comprising a first receiving room and a second receiving room, the first receiving room communicating with the second receiving room, the first receiving room being configured to receive a cylindrical battery, and the second receiving room being configured to receive a square battery;

a joint portion configured to attach the battery receptacle to the electronic device;

a power input interface configured to electronically connect with an electrode of the external battery;

a power output interface configured to electronically connect with an external power connector of the electronic device;

a battery cover slidably mounted on the main body, the battery cover being configured to slide to different positions to adapt to different square batteries of different sizes; and a plurality of slidable electrodes slidably connected to the raised portion, the plurality of slidable electrodes being configured to slide with respect to the raised portion, such that the plurality of slidable electrodes are able to contact electrodes of the square battery received in the second receiving room.

2. The battery receptacle of claim 1, wherein the joint portion is adjustable to fit the electronic device.

3. The battery receptacle of claim 2, wherein the joint portion comprises:

a positioning board;

a pair of clamping boards installed on two opposite sides of the positioning board and movable relative to the positioning board; and an elastic element installed between the positioning board and the pair of clamping boards.

4. The battery receptacle of claim 3, wherein the joint portion comprises a guide rod installed between the positioning board and the pair of clamping boards.

5. The battery receptacle of claim 1, further comprising a sliding groove defined on the middle of the receiving portion.

6. The battery receptacle of claim 5, further comprising a slidable pivot installed on the joint portion configured to pass through the sliding groove.

7. The battery receptacle of claim 1, wherein the battery cover comprises an upper cover and a stopper board perpendicularly connected with the upper cover, two guide posts perpendicularly connected with the stopper board, and two elastic elements individually coiled around the two guide posts, the receiving portion further defines two channels, the two guide posts are received in the two channels, the two elastic elements are compressed when the battery cover is pulled by an external force, and rebounds to drive the two guide posts to move back when the external force has ceased.

8. The battery receptacle of claim 1, wherein each slidable electrode comprises a sliding element and an elastic element, the sliding element is approximately T-shaped and defines a groove, the elastic element is inserted in the groove, two ends of the elastic element extend out of the groove.

* * * * *